(12) United States Patent
Miller

(10) Patent No.: US 8,251,401 B2
(45) Date of Patent: Aug. 28, 2012

(54) PERSONAL TRANSPORT CART

(76) Inventor: James J. Miller, Ottoville, OH (US)

( * ) Notice: Subject to any disclaimer, the term of this patent is extended or adjusted under 35 U.S.C. 154(b) by 475 days.

(21) Appl. No.: 12/498,394

(22) Filed: Jul. 7, 2009

(65) Prior Publication Data
US 2010/0001501 A1 Jan. 7, 2010

Related U.S. Application Data

(60) Provisional application No. 61/078,643, filed on Jul. 7, 2008.

(51) Int. Cl.
*B62D 1/18* (2006.01)
(52) U.S. Cl. .............. 280/775; 180/908; 280/124.175; 280/651; 280/DIG. 5
(58) Field of Classification Search .......... 280/775, 280/771, 68.1, DIG. 5, 651, 124.175; 180/907, 180/98, 307, 608
See application file for complete search history.

(56) References Cited

U.S. PATENT DOCUMENTS

| | | | | |
|---|---|---|---|---|
| 1,098,939 A * | 6/1914 | Chrysler | ................. | 477/24 |
| 3,556,549 A * | 1/1971 | Hershman et al. | ............ | 280/775 |
| 5,238,082 A | 8/1993 | Stegeman et al. | | |
| 5,307,891 A * | 5/1994 | Shaw et al. | .................. | 180/400 |
| 5,393,094 A * | 2/1995 | Wardavoir | ................... | 280/775 |
| 5,727,642 A | 3/1998 | Abbott | | |
| 6,732,830 B2 * | 5/2004 | Gagnon et al. | ............... | 180/291 |
| 7,264,252 B2 * | 9/2007 | Espriu | .................. | 280/124.175 |

* cited by examiner

*Primary Examiner* — Eric Culbreth
(74) *Attorney, Agent, or Firm* — Fraser Clemens Martin & Miller LLC; J. Douglas Miller

(57) ABSTRACT

A personal transport cart is disclosed. The cart is provided with a collapsible steering mechanism to lock the steered wheels for allowing alignment of the cart during the loading and unloading of the cart on a transport vehicle. Furthermore, the rear wheel can be locked against movement during the transportation of the cart on the transport vehicle.

11 Claims, 4 Drawing Sheets

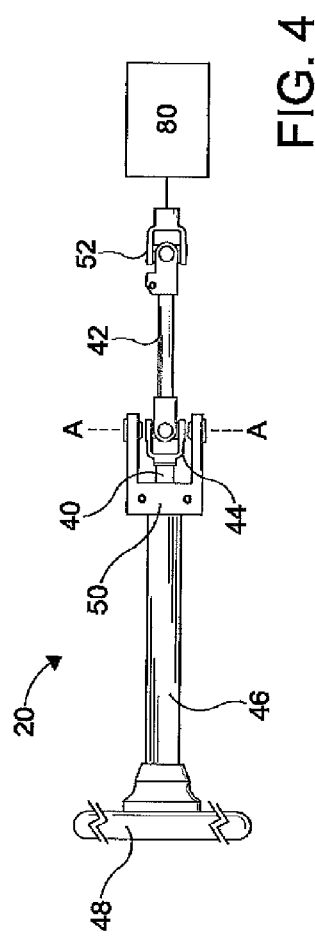
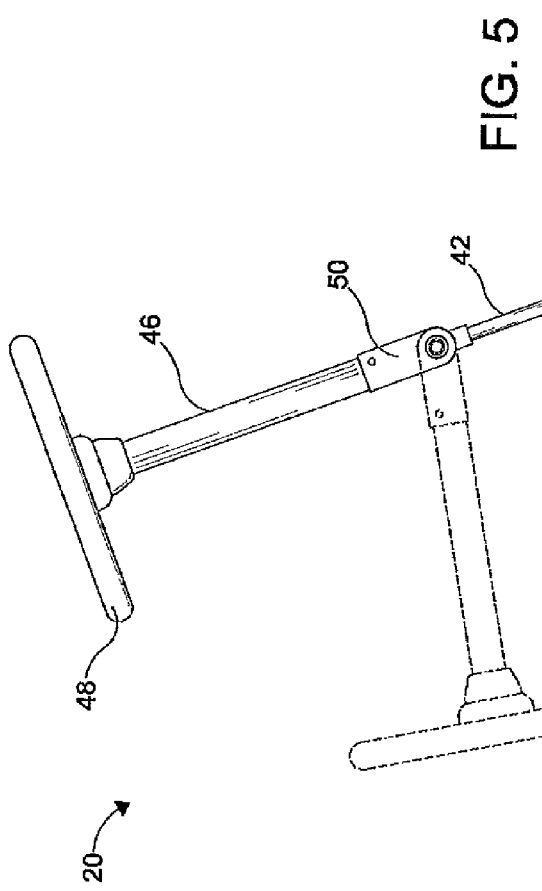

PERSONAL TRANSPORT CART

CROSS REFERENCE TO RELATED APPLICATION

This application claims the benefit of U.S. Provisional Patent Application Ser. No. 61/078,643 filed on Jul. 7, 2008.

BACKGROUND OF THE INVENTION

1. Field of the Invention

The present invention relates to carts for transporting people and goods and more particularly to an improved cart incorporating certain constructional features enhancing the characteristics thereof in respect of transporting the cart on an auxiliary vehicle.

2. Prior Art

The prior art is replete with carts for transporting people from one location to another. However, there are no carts which are designed to be readily transported from one location to another on a separate transport vehicle.

SUMMARY OF THE INVENTION

As the population ages, it becomes increasingly desirable to provide suitable transportation for older people who may have difficulty in walking. Transportation is typically available to transport people from their homes or assisted living facilities to a shopping mall. However, transportation at the shopping mall may not be available. Therefore, the older people need to avail themselves of supplemental transportation. Although many of these people own carts which are used at their homes, those carts are difficult to transport in an auxiliary vehicle. It would be desirable to produce a cart for transporting people which cart may be readily adopted for transportation on an auxiliary vehicle.

An objective of the present invention is to produce a cart which may be easily converted from the normal operative mode to a separate transportation mode. Another objective of the inventors is to produce a cart which may be readily converted from the normal operating mode to a mode to facilitate the loading of the cart on an auxiliary transport vehicle.

The above, as well as other objectives and advantages of the invention, can be readily achieved by a personal transport cart comprising of a main frame; ground engaging wheels attached to the frame; motor means for driving at least one of the wheels; a seat for supporting a person attached to the frame; and steering means for steering at least one of the wheels, the steering means being selectively adjustable from an operative to an inoperative position to reduce the overall silhouette of the cart for storage and to prevent the steering means from steering the at least one of the wheels.

BRIEF DESCRIPTION OF THE DRAWINGS

The above objectives and advantages of the invention will become readily apparent to those skilled in the art from reading the following detailed description of the preferred embodiment of the invention when considered in the light of the accompanying drawings, in which:

FIG. 4 is a fragmentary top view of the steering column of the cart illustrated in FIGS. 1-3;

FIG. 5 is a side elevational view of the steering column illustrated in FIG. 4 showing the first shaft of the steering column in an inoperative position in phantom;

DETAILED DESCRIPTION OF THE PREFERRED EMBODIMENT OF THE INVENTION

Figure 6:
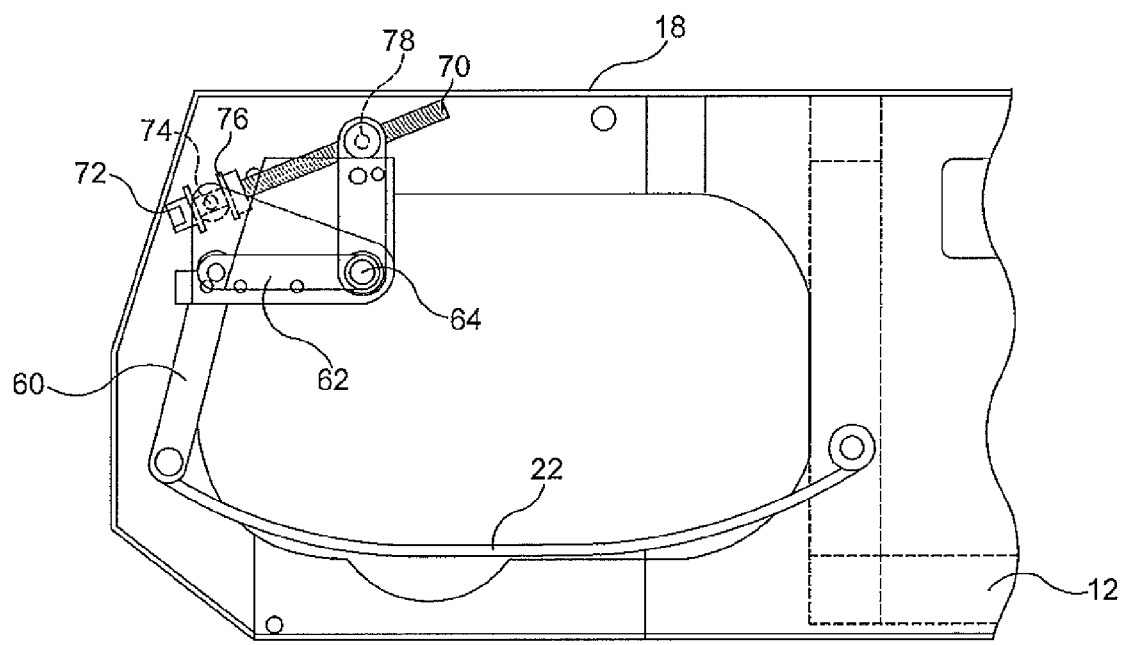
FIG. 6 is a fragmentary elevational view of the rear portion of the cart illustrated in FIGS. 1-3 showing a mechanism for lifting the rear wheels of the cart in preparation for transport on an auxiliary transport vehicle.
Figure 7:
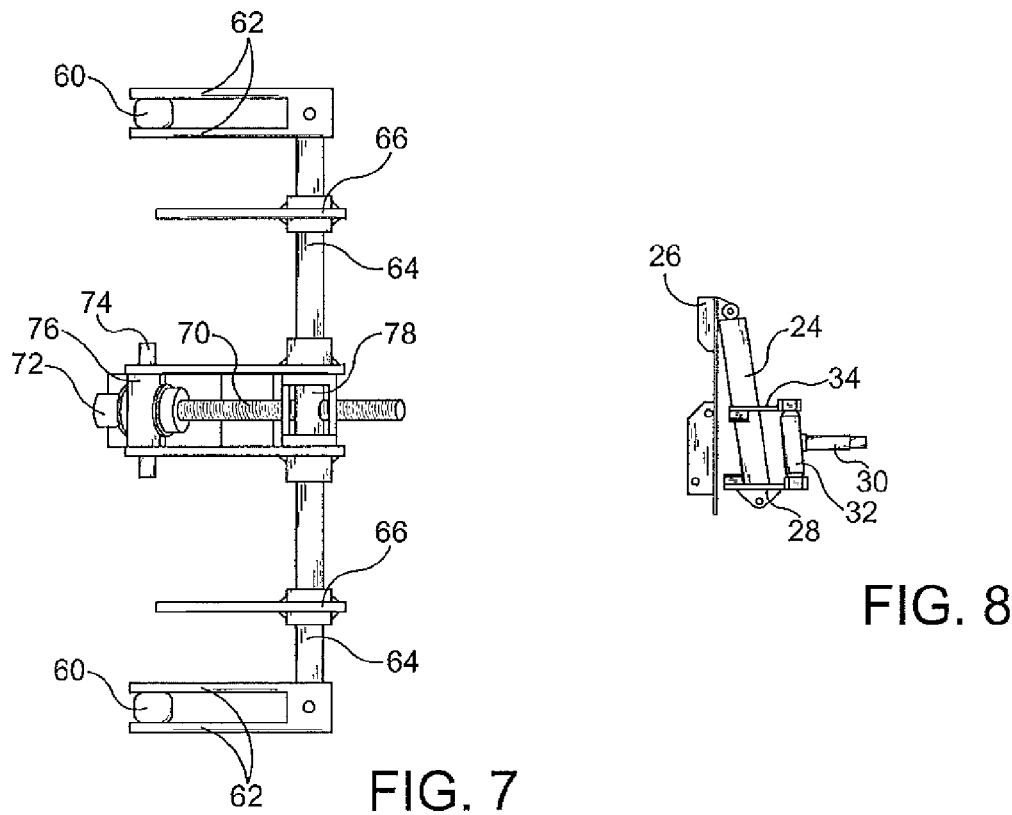
FIG. 7 is a top plan view of the mechanism illustrated in FIG. 6.

Referring to the drawings, there is illustrated a personal transport cart generally indicated by reference numeral 10 which includes a frame 12, only a portion of which is shown in FIG. 6; a plurality of ground engaging front wheels 14 and rear wheels 16; and a body 18 typically formed of a molded fiber glass reinforced plastic material. It will be understood that while the illustrated embodiment of the invention shows a separate body 18 and an associated frame 12, satisfactory results may be achieved by fabricating a monocoque constructions technique which would support the structural load by using the external body skin rather than using an internal frame. In the automotive field, the particular construction is often referred to as a unibody construction in which the body is integrated into a single unit with the chassis rather using a separate body-on-frame construction.

Figure 8:
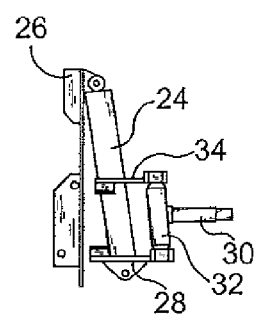
FIG. 8 is a fragmentary view of a portion of the suspension system for one of the front wheels of the cart illustrated in FIGS. 1-3.

The front wheels 14 are used to steer the cart 10 through conventional cart steering linkage which is coupled to a collapsible steering column generally indicated by reference numeral 20. The front wheels 14 are independently sprung in respect to the body 18 and frame 12, while the rear wheels 16 are mounted on an axle, not shown, which is mounted on a pair of spaced apart leaf springs 22, only one of which is illustrated for sake of simplicity. The front wheels 14 are independently sprung in respect of the body 18 and the frame 12 by a mechanism generally illustrated in FIG. 8. FIG. 8 shows the suspension system for mounting the front wheels 14. More specifically, since the mechanism for the front wheels are mirror images of one another, only a single mechanism will be described. The support structure for each of the front wheels includes a shock absorber 24.

The upper end of the shock absorber 24 is connected to the body frame 12 through an upper shock absorber mount 26, while the lower end of the shock absorber 24 is mounted to a lower, A-arm bracket 28. A spindle 30 extends outwardly from a vertical shaft 32 which is mounted for rotation about a vertical axis between the lower A-arm bracket 28 and an associated upper A-arm bracket 34. A steering arm (not shown) is formed integral with the shaft 32 and extends outwardly therefrom at a generally right angle with the spindle 30. It will be understood that the spindle 30 is adapted to rotatingly support a wheel bearing of a front wheel 14. A tie rod (not shown) is coupled between the steering arm and the rack of a rack and pinion assembly 80.

The steering column 20 includes a first shaft 40 and a second shaft 42 as illustrated in FIG. 4. The shafts 40 and 42 are coupled together by a universal joint 44. The universal joint 44 allows for pivotal movement of the first shaft 40 and the second shaft 42 in a single plane about the pivotal axis A-A in FIG. 4.

The first shaft 40 of the steering column 20 is mounted to extend within the length of an outer hollow tubular shaft 46. The outer end of the first shaft is coupled to a steering wheel 48. The outer end of the hollow tubular shaft 46 is fitted loosely within an annular groove formed in the underside of the steering wheel 48 to allow for relative rotational motion therebetween. The opposite end of the tubular shaft 46 is provided with a yoke 50 which is pivotally mounted to the body 18 of the cart 10. Normally, the yoke 50 cooperates with a suitable locking mechanism (not shown) to maintain the steering assembly in the position illustrated in full lines in FIGS. 4 and 5 wherein the longitudinal axis of the first shaft 40 and the second shaft 42 are in substantial alignment. In the illustrated position, the steering wheel 48 is able to rotate the first shaft 40 and the second shaft 42 to simultaneously impact rotation at the outer end of the second shaft 42 of the steering column 20.

The universal joint 52 is connected to the pinion of a rack and pinion assembly 80 wherein rotation of the pinion gear, which meshes with the rack, moves the rack thereby converting the rotary or circular motion of the pinion gear into linear motion of the rack. The linear motion of the rack is then transmitted to the associated tie rods which in turn apply steering movement to the front wheels 14.

When it is desired to lock the front wheels in position, the yoke 50 is unlatched, through appropriate linkage, by moving the switch handle 54. By unlatching the yoke 50, the steering wheel 48, the tubular shaft 46, and the first shaft 40 may be moved to the position illustrated phantom lines in FIG. 5. In the illustrated position, the longitudinal axis of the first shaft 40 and the second shaft 42 are at substantial right angles to one another thereby militating against any rotational motion of the steering wheel 48. Accordingly, the front wheels 14 are locked in position.

With reference to FIG. 6, there is illustrated a system for lowering the body 18 in respect of the rear wheels 16. Such lowering motion will cause the outer peripheral surface of the tires of the wheels 16 to frictionally engage a surface in the associated wheel well of the body 18 to thereby function as a braking mechanism to prevent motion of the cart 10 typically during the transport of the cart 10 on an associated transport vehicle. It will be understood that the preferred embodiment of the cart 10 includes leaf springs 22 which are connected to the rear axle assembly, which in turn drives the rear wheels 16. The motor means for driving the rear wheels 16 is preferably an electric motor with a self contained battery pack. In certain instances, it may be desirable to control the motor by remote control during the loading and unloading of the cart 10 from a transport vehicle.

The braking mechanism includes an extensible linkage for extending and retracting the distance that the rear of the leaf springs 22 are connected to the body 18 of the cart 10. More specifically, there is illustrated an embodiment for affecting the extension and retraction which includes a link 60 having one end pivotally connected to the rear of the leaf spring 22 and the outer end pivotally connected to a lever arm 62 which is connected to a shaft 64. The shaft 64 is pivotally attached to the body 18 at 66.

An externally threaded rod 70 having a longitudinal axis and a crank receiving head 72 is mounted for pivotal movement about a mounting pin 74 and rotational movement about the longitudinal axis of the rod. The mounting pin 74 extends through the outer ends of a supporting bracket 76 which is welded or otherwise affixed to the shaft 64. The threaded rod 70 is threadably engaged within an internally threaded bore of a member 76 which is pivotally mounted to the pin 74. The extension of contraction of the rod 70 cause simultaneous rotation of the shaft 64 In respective directions.

Rotation of the shaft 64 will cause movement of the lever arms 62 and the associated linkages 60 fastened to the rear ends of the leaf springs 22. Depending upon the rotation of the shaft 64 (clockwise or anti-clockwise), the body 18 will either be raised or lowered in respect of the rear wheels 16. In order to militate against movement of the cart 10 while on an auxiliary transport vehicle, for example, the shaft 64 is rotated to cause the body 18 to frictionally contact a portion of the outer peripheral surface of the tires of the rear wheels 16 to immobilize the cart 10 from any to and fro movement.

The process of loading the cart 10 on an auxiliary transport vehicle is quite simple and involves the initial step driving the cart 10 to alignment with ramp members extending between the ground and the bed of the transport vehicle. At this point, the steering wheel 48 is collapsed from the upright steering position (FIGS. 1, 2, and 3) to the position illustrated in FIG. 3 and in phantom lines in FIG. 5. This will successfully lock the front wheels 14 to insure that the wheels 14 will guide the cart 10 up the ramp and into the transport vehicle. At the point, it may sometimes be desirable to provide a remote control system for the energization of the driving motor. Such a system would enable the operator to stand away from the cart 10 and control the loading or unloading of the cart 10.

Upon reaching the appropriate location of the bed of the transport vehicle, the cart 10 is stopped and the motor is turned off. The operator then cranks the threaded rod 70 to cause the body 18 to be lowered until frictional engagement with the tires of the rear wheels 16 is achieved. The cart 10 being thereby immobilized, the operation of the transport vehicle may be commenced to transport the cart 10 to another location.

When the transport vehicle arrives at the desired destination, the unloading of the cart 10 is achieved by reversing the above explained loading procedures.

Figure 1:
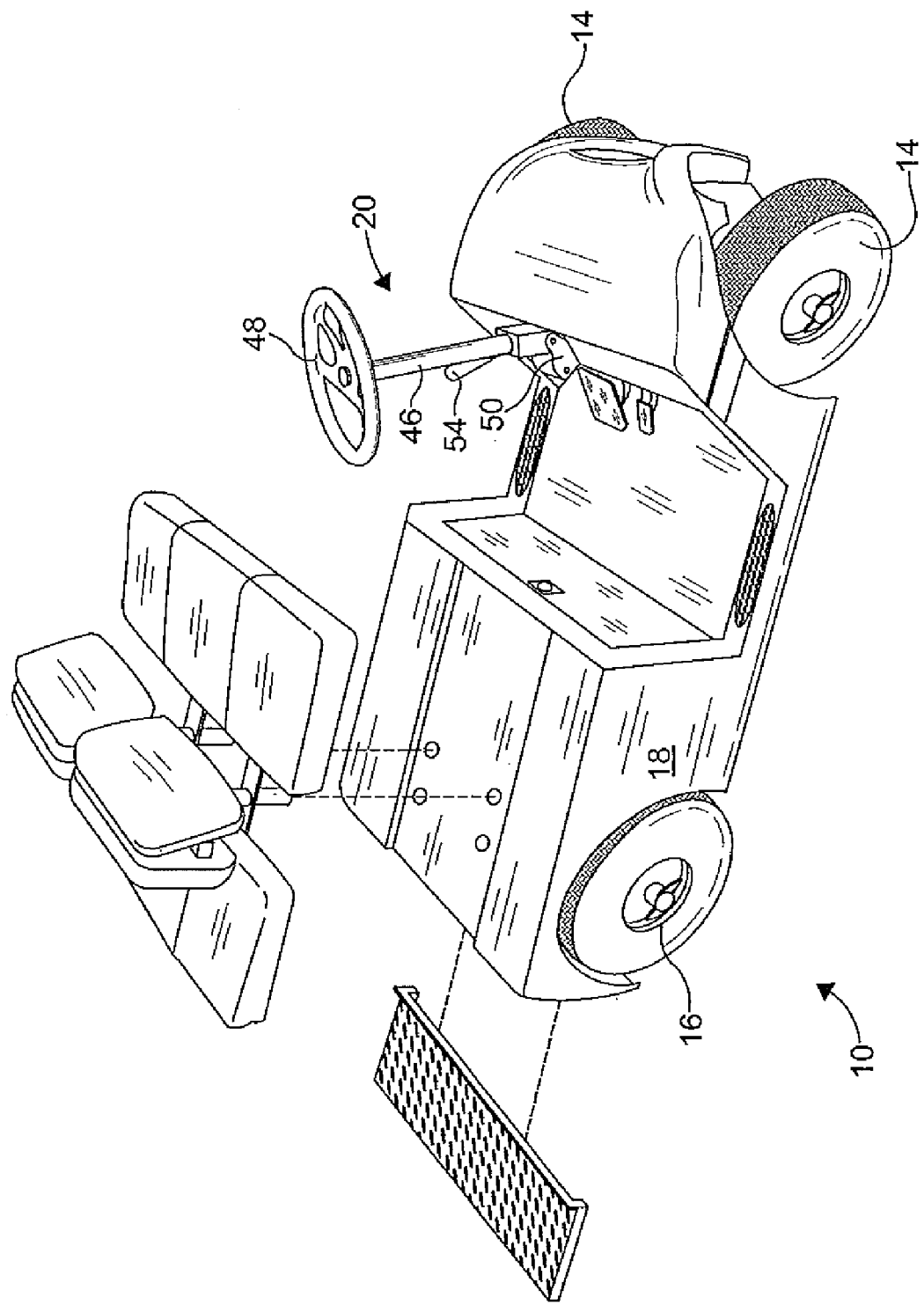
FIG. 1 is a perspective exploded view of a personal transport cart embodying the features of the present invention.
Figure 2:
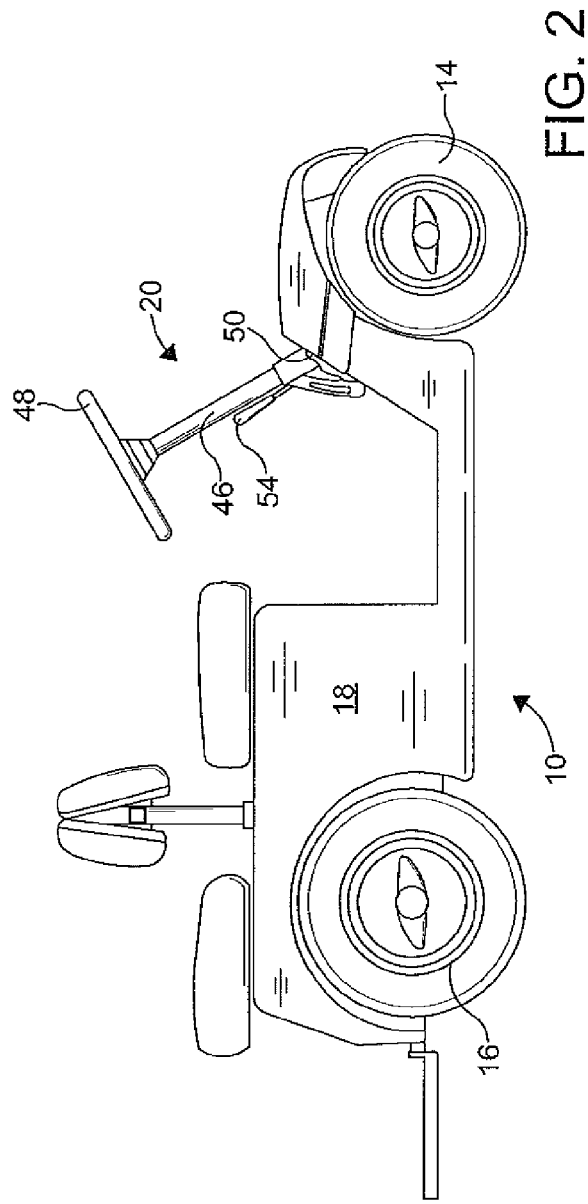
FIG. 2 is a side elevational view of the cart illustrated in FIG. 1.
Figure 3:
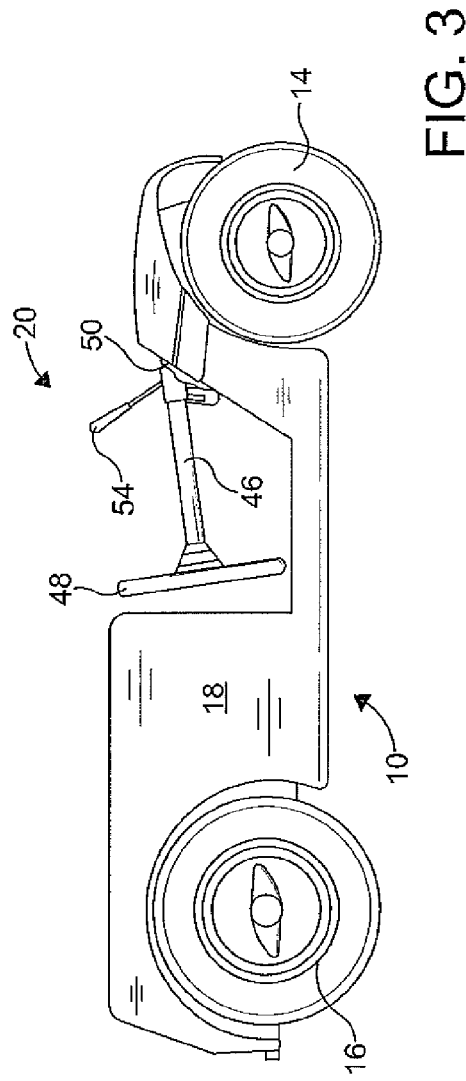
FIG. 3 is a side elevational view of the car illustrated in FIGS. 1 and 2 showing the cart in condition to be transported on an auxiliary vehicle or to be stored.

As generally illustrated in FIGS. 1 and 2, the cart 10 can be readily equipped with a universal adapter or hitch to accommodate a variety of accessories, such as for example, a footrest or golf bag holder. Attachment means may also be provided for the attachment of a variety of seating arrangements; such as for example: Seating for four, as illustrated in FIGS. 1 and 2; seating for two with other accessories attached such as a tool box or food and beverage storage container; and seating for one with additional attached accessories.

In accordance with the provisions of the patent statutes, the present invention has been described in what is considered to represent its preferred embodiment. However, it should be understood that the invention can be practiced otherwise than as specifically illustrated and described without departing from its spirit or scope as defined in the appended claims.

What is claimed is:

1. A transport cart comprising:
a main fame;
ground engaging wheels attached to the frame;
motor means for driving at least one of the wheels; and
steering means for steering at least one of the wheels including:
  a steering column having a first shaft and a second shaft each having a longitudinal axis;
  a universal joint interconnecting the first shaft to the second shaft and permitting relative pivotal movement of the first shaft and the second shaft about an axis perpendicular to the longitudinal axes of the first shaft and the second shaft;
  means connecting the second shaft to a pinion of a rack and pinion assembly wherein a rack is connected to the at least one of the wheels being steered to impart rotary motion to a pinion when the longitudinal axes of the first shaft and the second shaft are in substantial alignment; and a steering wheel mounted at one end of the first shaft, a hollow tubular shaft surrounding the first shaft and having a first outer end and terminating in a second inner end, a yoke connected to the inner end of the tubular shaft pivotally mounted to the body of the cart about an axis substantially in alignment with the axis of the universal joint about which one of the first shaft, the second shaft, and the first shaft and the second shaft of the steering column pivot.

2. A cart as defined in claim 1 wherein the first outer end of the hollow tubular shaft terminates adjacent the steering wheel.

3. A cart as defined in claim 1 wherein the ground engaging wheels include at least one steering front wheel and a pair of spaced apart rear wheels.

4. A cart as defined in claim 3 wherein the at least one steerable front wheel is independently sprung in respect of the frame.

5. A cart as defined in claim 3 including at least one leaf spring attaching the rear wheels to the frame.

6. A cart as defined in claim 5 wherein the at least one leaf spring has a front pivotal mounting to the frame and a rear pivotal linkage mounting to the frame.

7. A cart as defined in claim 6 including means for extending and contracting the rear pivotal linkage to raise or lower the frame in respect of the rear wheels.

8. A cart as defined in claim 7 including a body for the cart attached to the frame.

9. A cart as defined in claim 8 including occupants seating removably attached to the body.

10. A cart as defined in claim 7 including a transverse shaft rotatably mounted to extend transversely of the cart and having a lever arm extending therefrom and terminating in an outer end pivotally through linkage to the rear of the leaf spring.

11. A cart as defined in claim 10 including an externally threaded adjustment screw and linkage for rotating the transverse shaft.

\* \* \* \* \*